Jan. 30, 1962 F. V. LEWIS 3,019,391

PULSE SHAPING CIRCUIT

Filed Feb. 26, 1959 2 Sheets-Sheet 1

INVENTOR.
FLOYD V. LEWIS

BY John f Lawler

ATTORNEY

Jan. 30, 1962 F. V. LEWIS 3,019,391

PULSE SHAPING CIRCUIT

Filed Feb. 26, 1959 2 Sheets-Sheet 2

INVENTOR.
FLOYD V. LEWIS

BY John F Lawler

ATTORNEY

United States Patent Office 3,019,391
Patented Jan. 30, 1962

3,019,391
PULSE SHAPING CIRCUIT

Floyd V. Lewis, Santa Clara, Calif., assignor, by mesne assignments, to Sylvania Electric Products Inc., Wilmington, Del., a corporation of Delaware Filed Feb. 26, 1959, Ser. No. 795,828
3 Claims. (Cl. 328—34)

This invention relates to pulse shaping circuits and in particular to a circuit for shaping a modulator pulse which is applied to a magnetron oscillator to start its operation.

The starting characteristics of a magnetron are such that it will fail to break into oscillations if the slope on the front of the modulator pulse applied to the magnetron is too steep. This result obtains because the pulse voltage increases so rapidly that it passes through the operating voltage range of the magnetron before oscillations can build up. The situation is corrected either by slowing the rate of rise of the modulator pulse through lengthening the rise time of the modulator grid pulse, or by adding capacitance across the magnetron input. Such methods are, however, not satisfactory for pulse group operation wherein the pulse width and spacing between pulses are relatively short, for example, 0.5 microsecond or less, because of resulting interference between successive pulses.

More specifically, the difficulty with lengthening the rise time of the modulator grid pulse is that the slope of the modulator output pulse is determined by the plate current flowing in the modulator tube during the rise time. This current is in turn determined by the voltage applied to the modulator grid. A long grid voltage rise time produces a modulator output with a slope that increases as the grid voltage increases and which therefore may become excessively steep as the operating region of the magnetron is approached. For example, in one application it was necessary to increase the grid signal rise time from 0.1 to 0.5 microsecond in order to increase the modulator output rise time from 0.075 to 0.15 microsecond, the latter being the minimum time required for starting the magnetron. Under such circumstances, pulse group operation with pulse spacing of less than 0.5 microsecond is not possible.

The other alternative of placing capacitance across the magnetron input has the effect of excessively lengthening the recovery time of the modulator pulse because the circuit has a higher impedance during the recovery period when the modulator tubes are cut off than during the rise period when the modulator tubes are conducting. Close spacing of pulses again is impossible with this technique because one pulse would appear before the prior pulse had disappeared.

In accordance with my invention, the leading edge of the modulator input pulse is formed with a step, that is, the grid voltage rises quickly to a set value, then remains constant for a predetermined interval, and finally increases to its full value. This stepping is accomplished by means of a load tube in the modulator grid circuit and a delay line which couples the output of the driver tube to this load tube in such a manner as to vary the effective impedance across the modulator grid to produce a step on the front of the grid pulse. This permits the modulator to develop an output pulse with a predetermined rise time suitable for properly starting the magnetron.

A primary object of my invention is the provision of a pulse shaping circuit which provides accurate control of the rate of voltage rise in a magnetron modulator output pulse and yet permits pulse group operation wherein the time between pulses is 0.5 microsecond or less. A further object is the provision of a circuit for developing a properly shaped pulse for starting a magnetron without, however, adversely affecting magnetron operation.

These and other objectives of my invention will become apparent from the following description of a preferred embodiment thereof, reference being had to the accompanying drawings in which.

Figure 1:
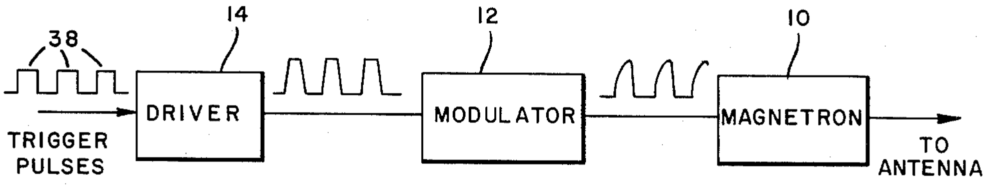
FIGURE 1 is a block diagram of a pulse generating system with which my invention is concerned.

Referring now to the drawings, the invention hereinafter described has utility in a pulsed microwave generating system shown in FIGURE 1 comprising a magnetron 10 connected to the output of a modulator 12 which provides the pulse of proper shape to the magnetron in response to corresponding pulses produced by a driver circuit 14. The output pulse of the modulator impresses a rapidly rising voltage across the magnetron which breaks into oscillations and continues to produce high-frequency high-power microwave energy for the duration of the modulator pulse.

Figure 2:
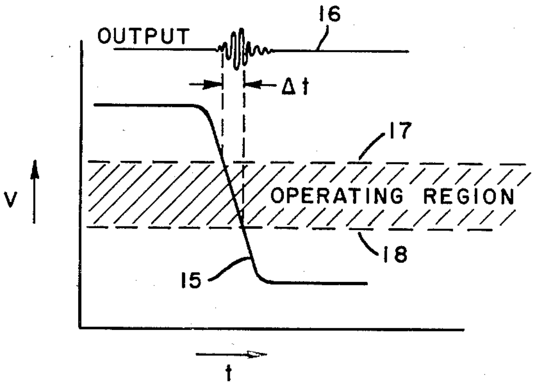
FIGURES 2 and 3 are schematic diagrams showing the relationship of pulse rise time to effective starting of a magnetron.
Figure 3:
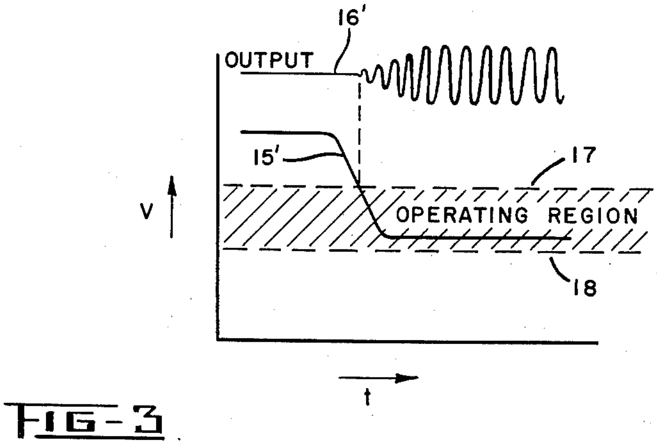

The starting of the magnetron is dependent upon the rate of increase as well as the magnitude of the impressed pulse voltage. If the voltage rises too rapidly, the limits of the operating region of the magnetron are traversed before it can produce full scale oscillations. and the magnetron fails to start. This condition is illustrated schematically in FIGURE 2 wherein the slope of curve 15, representing the modulator output, is so steep that the time $\Delta t$ of excitation of the magnetron is insufficient to permit build up of the oscillations indicated by the magnetron output curve 16. This difficulty is overcome by decreasing the rate of change of the voltage as illustrated in FIGURE 3 wherein the slope of the voltage curve 15' is less than the slope of the curve 15. The magnetron now has sufficient time to generate oscillations at full amplitude as suggested by the curve 16'. The horizontal broken lines 17 and 18 bounding the shaded area in each of FIGURES 2 and 3 represent the upper and low voltage limits of the magnetron operating range. It will be noted that the lower portion of curve 15' levels off within the operating range because of the change in the impedance of the magnetron when it begins to conduct.

In transmitting systems based on single pulse operation or on pulse group operation wherein the space between pulses is in the order of one microsecond or more, the rise time of the modulator output pulse may be increased by lengthening the rise time of the modulator grid pulse or by adding capacitance across the magnetron input to slow down the rise at that point. However, in pulse group operation wherein the spacing between the initiating pulses is 0.5 microsecond or less, these techniques are unsatisfactory because the increased time of voltage rise causes interference between successive pulses and thereby imposes a lower limit of approximately 0.5 microsecond on interpulse spacing. In accordance with my invention, stepped shaping of the modulator grid pulse overcomes such limitation on pulse spacing.

Figure 4:
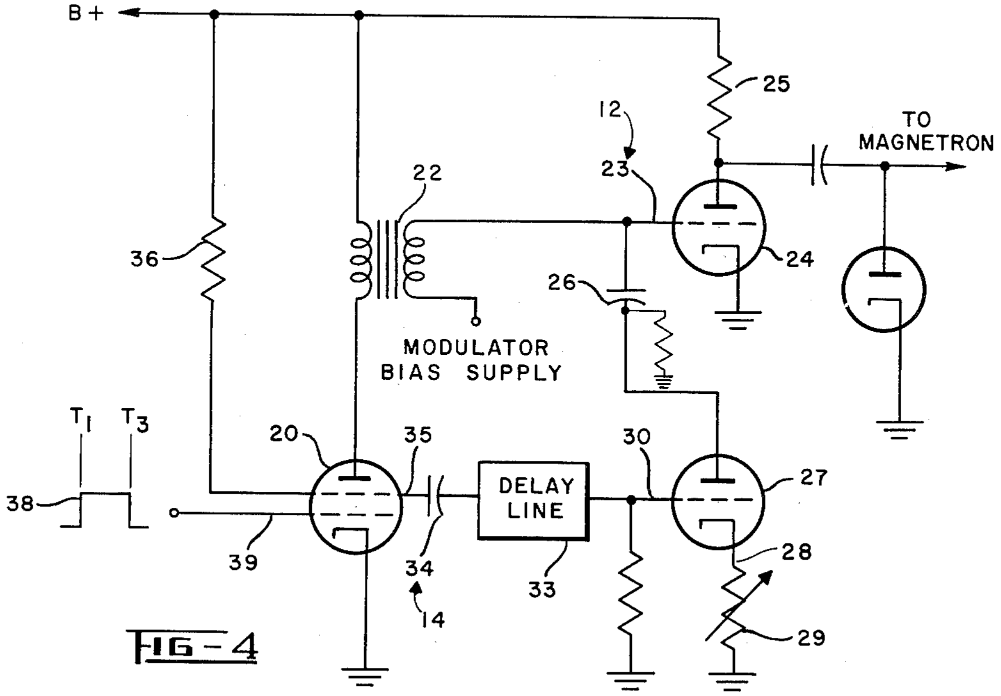
FIGURE 4 is a simplified circuit diagram of the pulse forming circuit embodying my invention.

A preferred embodiment of the invention is shown in FIGURE 4. A driver tube 20 is connected by coupling transformer 22 to grid 23 of modulator tube 24, having a plate load resistor 25. In practice, several parallel connected modulator tubes are used, but only one is described herein and in the drawings for clarity of explanation. Grid 23 is connected through blocking condenser 26 to the plate of a load tube 27, preferably a triode, whose cathode 28 is connected to ground through potentiometer 29. Load tube 27 is, in effect, a variable impedance across the modulator grid, and presents a low impedance when the load tube is conducting and a high impedance when it is not. The operation of load tube 27 is controlled by its grid 30, connected through a delay line 33 and blocking condenser 34 to the screen grid 35 of driver tube 20, the latter grid being connected to the power supply through load resistor 36. Load tube grid 30 normally is at ground potential so that the tube conducts when a positive pulse is applied to its plate.

The operation of this circuit will now be explained in conjunction with the wave forms shown in FIGURE 5. The positive input pulse 38, see FIGURE 1, preferably is a square wave. This pulse is applied to the grid 39 of the driver tube to start the operation of the circuit, and has a leading edge occurring at time $T_1$ and a trailing edge occurring at time $T_3$. Driver tube 20 conducts at time $T_1$ causing the voltage of the modulator tube grid 23 to increase sharply as indicated at 40 in FIGURE 5(*c*). At the same time, the driver screen grid 35 draws current and the voltage across the screen grid drops as indicated at 41 in FIGURE 5(*a*). This drop appears at the input to the delay line at time $T_1$, but does not immediately appear at the grid 30 of load tube 27 because of the delay introduced by delay line 33.

The increase in modulator grid voltage at time $T_1$ raises the plate voltage of load tube 27 which conducts, thereby placing a relatively low impedance across grid 23. This has the effect of limiting further increase in the modulator grid voltage which therefore levels off or produces a step during the interval between the times $T_1$ and $T_2$, as indicated at 42 in FIGURE 5(*c*). Adjustment of the height of step 42, that is, the magnitude of the pulse voltage at the flat part 42 of the curve, is accomplished by potentiometer 29 in the cathode circuit of load tube 27. The height of step 42 varies in proportion to the amount of resistance 29 in the cathode circuit. Tube 27 continues to conduct until the delayed negative screen grid pulse of driver tube 20 is impressed across load tube grid 30 at time $T_2$, as indicated at 44 in FIGURE 5(*b*), at which time tube 27 is biased to cut off. This places a relatively high impedance across modulator grid 23 and permits the full amplitude of the driver output pulse to be applied to the modulator grid during the remainder of the pulse.

Figure 5:
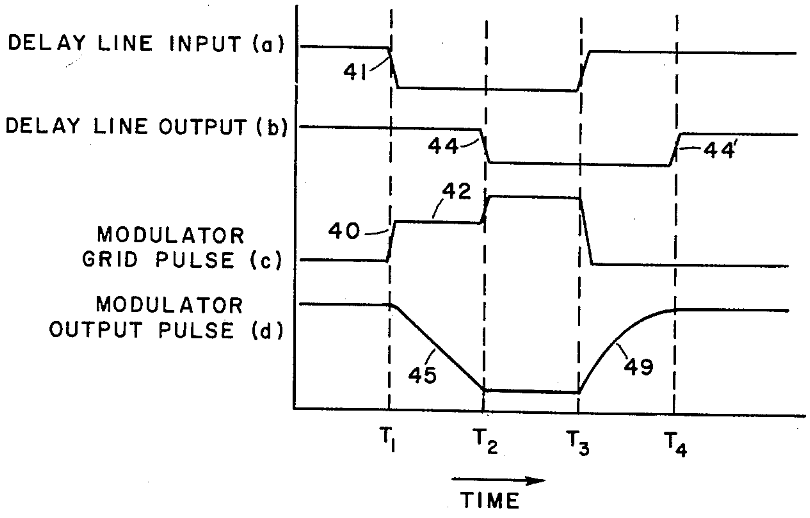
FIGURE 5 is a diagram showing wave forms at various points in the pulse forming circuit.

The wave form of the output of the modulator tube is shown in FIGURE 5(*d*). The significant part of this wave is the substantially constant slope of the leading edge 45 during the times $T_1$ and $T_2$. This slope is dependent upon the plate current flowing in the modulator tube, and this, in turn, depends upon the magnitude of the modulator grid voltage. Since the latter is relatively constant during the time of $T_1$ to $T_2$, the modulator output pulse slope is constant as shown. The slope angle is controlled by adjustment of potentiometer 29. At or about the time $T_2$, the magnetron begins to conduct, its impedance drops as oscillations build up and the modulator output pulse wave form becomes substantially flat between time $T_2$ and $T_3$.

The input pulse signal 38 to the driver has a width equal to $(T_3-T_1)$. When the trailing edge of the pulse passes, at time $T_3$, the driver tube ceases to conduct and grid 23 of modulator tube 24 is driven negative. The modulator tube ceases to conduct and the capacitor, not shown, in the modulator output circuit charges between times $T_3$ and $T_4$ as indicated at 49 in FIGURE 5(*d*). At or about the time $T_4$ the pulse trailing edge 44' appears at the delay line output and the circuit is restored to its original condition, in readiness for another cycle of operation.

It will be seen from the foregoing description that relatively convenient control of the rate of rise of the modulator output pulse is afforded by this circuit without, however, otherwise affecting the operation of the magnetron, or unduly complicating the modulator input circuit. By adjustment of potentiometer 29 in the load tube cathode the slope of the leading edge of the modulator output pulse may be readily changed to permit proper excitation and starting of the magnetron. The time interval $(T_2-T_1)$ during which the modulator output pulse increases to full amplitude is determined by the delay time of delay line 33.

By way of example, a pulse shaping circuit having components and constants with the following characteristics and values has been constructed and successfully tested:

| | |
|---|---|
| Magnetron | RETMA No. 5586. |
| Driver tube **20** | JAN 3E29. |
| Load tube **27** | JAN 3E29, triode connected. |
| Modulator tube **24** | Four EIMAC 4–1000A tubes in parallel. |
| Delay line $(T_2-T_1)$ | 0.15 μsec. |
| Resistance **29** | 100 ohms. |
| Pulse **38**: | |
| Amplitude | 200 volts. |
| Width $(T_3-T_1)$ | 0.25 μsec. |
| Spacing between pulses | 0.25 μsec. |
| Cycle time $(T_4-T_1)$ | 0.40 μsec. |

Changes, modifications and improvements to the above described preferred embodiment of my invention may be made by those skilled in the art without departing from the precepts of this invention. The scope of the invention is defined in the appended claims.

I claim:

1. A pulse shaping circuit comprising a driver tube having control and screen grids and a plate circuit, means to apply to said driver control grid a signal input in the form of a pulse having a steep leading edge, a modulator tube having a control grid and a plate circuit, transformer means for coupling the plate circuit of the driver tube to the control grid of the modulator tube, a load tube having a plate-cathode circuit connected in parallel with the grid of said modulator tube and having a control grid, and means including a delay line connecting said driver screen grid to said load tube control grid.

2. A pulse shaping circuit comprising a driver tube having control and screen grids and a plate circuit, means to apply to said driver control grid a signal input in the form of a pulse having a steep leading edge, a modulator tube having a control grid and a plate circuit, transformer means for coupling the plate circuit of the driver tube to the control grid of the modulator tube, a load tube having a plate-cathode circuit connected in parallel with the grid of said modulator tube and having a control grid, a variable resistor in the plate-cathode circuit of said load tube, and means including a delay line connecting said driver screen grid to said load tube control grid whereby the leading edge of the pulse on the modulator grid has a delay step wherein the pulse voltage remains substantially constant for a time interval equal to the time delay of said delay line, the magnitude of said constant pulse voltage being determined by the resistance of said variable resistor.

3. A pulse shaping circuit comprising a driver tube, means to apply to said driver tube a signal input voltage in the form of a pulse having a steep leading edge, a modulator tube having a control grid, means for coupling the output of said driver tube to the control grid of the modulator tube, a load tube connected across the grid of said modulator tube and operable when the pulse voltage reaches a predetermined value less than full pulse voltage to present a low impedance, and delay means connecting the output of said driver tube to the load tube and responsive to the driver output for changing the operation of said load tube whereby to present a high impedance across the modulator grid at a predetermined time after the start of said pulse.

References Cited in the file of this patent

UNITED STATES PATENTS

| | | |
|---|---|---|
| 2,446,613 | Shapiro | Aug. 10, 1948 |
| 2,469,174 | Okrent | May 3, 1949 |
| 2,493,379 | Anderson et al. | Jan. 3, 1950 |
| 2,708,239 | Okrent | May 10, 1955 |
| 2,774,871 | Dow | Dec. 18, 1956 |
| 2,922,879 | Vogt et al. | Jan. 26, 1960 |